United States Patent
Combs et al.

(10) Patent No.: US 6,766,348 B1
(45) Date of Patent: Jul. 20, 2004

(54) METHOD AND SYSTEM FOR LOAD-BALANCED DATA EXCHANGE IN DISTRIBUTED NETWORK-BASED RESOURCE ALLOCATION

(75) Inventors: Charles Combs, Las Cruces, NM (US); Jeffrey Gold, Stamford, CT (US); Brian Mair, New Canaan, CT (US); David Pedersen, Monument, CO (US); David Schear, Oradell, NJ (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/365,631

(22) Filed: Aug. 3, 1999

(51) Int. Cl.[7] ............................................. G06F 17/00
(52) U.S. Cl. ..................... 709/104; 709/105; 709/100; 709/226; 709/228; 709/229; 710/268
(58) Field of Search ............................... 709/100, 104, 709/105, 226, 228, 229; 710/268

(56) References Cited

U.S. PATENT DOCUMENTS

| | | | | |
|---|---|---|---|---|
| 5,511,208 A | * | 4/1996 | Boyles et al. | ............... 709/223 |
| 5,867,665 A | * | 2/1999 | Butman et al. | ............. 709/239 |
| 6,044,367 A | * | 3/2000 | Wolff | ............................. 707/2 |
| 6,092,178 A | * | 7/2000 | Jindal et al. | .................... 712/27 |
| 6,112,243 A | * | 8/2000 | Downs et al. | ............... 709/226 |
| 6,263,358 B1 | * | 7/2001 | Lee et al. | .................... 709/100 |

* cited by examiner

Primary Examiner—Anil Khatri
Assistant Examiner—Thomas Pham

(57) ABSTRACT

A method and system for allocating distributed resources connected to a computer network to application programs running on computers attached to the communications network. The distributed resource allocator system comprises a number of identical processes running on one or more computers attached to the communications network. Application programs request allocation of resources from a local distributed resource allocator system process running using a resource allocator applications programming interface. Application programs request allocation of resource from a remote distributed resource allocator system process via a resource allocator access protocol. The distributed resource allocator system is fault-tolerant and provides contention control and load balancing. The resource allocator system also manages information about the capacities and capabilities of resources connected to the communications network. Application programs can thus be easily written to make use of distributed resources connected to a communications network without having to manage global network information and without needing complex contention control and load balancing subroutines.

20 Claims, 15 Drawing Sheets

| Operation | Description | Invoker | Performer |
|---|---|---|---|
| Bind | Begin a session | RA User | RAHS |
| Unbind | End a session | RA User | RAHS |
| Register-Resource | Add resource to resource database | RA User | RAHS |
| Unregister-Resource | Removes a resource from the resource database | RA User | RAHS |
| Begin-Allocating-Resource | Begin allocation of a resource | RA User | RAHS |
| Stop-Allocating-Resource | Terminates the allocation of a resource | RA User | RAHS |
| Allocate-Resource | Perform resource allocation function | RA User | RAHS |
| Set-Current-Capacity | Sets remaining capacity of an allocatable resource | RA User | RAHS |
| Deallocate-Resource | Releases an allocated resource | RA User | RAHS |
| Schedule-Task | Schedules a task to be performed by a resource | RA User | RAHS |
| Perform-Task | Instructs a resource to perform a scheduled task | RAHS | RA User |
| Provide-Next-Task | Allows a resource to request the next task of a series | RA User | RAHS |

FIG. 11

METHOD AND SYSTEM FOR LOAD-BALANCED DATA EXCHANGE IN DISTRIBUTED NETWORK-BASED RESOURCE ALLOCATION

TECHNICAL FIELD

The present invention relates to communications networks and, in particular, to the exchange of data between users of computational resources connected to a communications network and a distributed resource allocation system that manages the use of those computational resources.

BACKGROUND OF THE INVENTION

A typical communications network comprises a number of computers and other electronic devices interconnected by a data transmission network. Data transmission networks include public switched telephone networks (PSTNs), ATM networks, internal intranets, the Internet and private networks implemented using any of a large number of available software and hardware components. Commonly, a computer is connected to a physical data transmission network through one or more physical ports, each port having a unique network address. Additional types of electronic devices can also be directly connected to a physical data transmission network or can be accessed from the physical data transmission network through an intermediate computer to which the electronic devices are attached. These additional electronic devices include modems, printers, switchboards, and audio response units.

Each computer attached to the network can execute one or more software programs. An instance of a running program is called a process. A person using a general purpose computer normally launches the execution of application programs. Application programs include word processing programs, web browsers, spread sheets, and computer games. Such programs will be called "users" in the following discussion. Application programs can, in turn, request and make use of operating system services provided by concurrently executing operating system programs. These services include transfer of data from one general purpose computer to another over a physical data transmission network. The data may be transferred to another application program running on a remote computer or to a peripheral device such as a modem or a printer. An application program may also initiate execution of a program on a remote computer, transmit data to that program, and receive data back from that program over a physical data transmission network. The electronic devices, including computers, that a user may directly request services from, either directly or indirectly through operating system calls, are commonly referred to as computer resources.

FIG. 1 represents a schematic diagram of a simple communications network. The physical data transmission network 101 is represented as a central spoke and hub feature connecting the remaining elements in the diagram. These remaining elements include computers 102–106, users 107–110, and resources 112–118. One resource 112 is connected directly to the physical data transmission network. Resources 113–118 are indirectly connected to the network through computers. Tasks are processes running on a multi-tasking computer. Each task is launched by a user. The capacity of this multi-tasking computer 106 to run processes is considered a resource. Resources 112–118 represent printers, modems, switchboards, or other electronic devices.

A communications network, like the network displayed in FIG. 1, provides the potential for a user running on one computer to exchange data with, and request services from, remote resources connected to the network. For example, suppose computer 102 in FIG. 1 represents a personal computer running a software application program corresponding to user 107. Resource 113, which is attached directly to this personal computer, represents a black and white laser printer. Resource 114, which is directly connected to computer 104, represents a color printer. Suppose that user 107 has been directed to print out a color diagram. In order to print the color diagram, user 107 must send to computer 104, through the physical data transmission network, a file representing the diagram to be printed and a request that that file be printed out by the color printer 114. Even in a simple communications network, like the one displayed in FIG. 1, attempts by several users to simultaneously access remote resources can lead to a number of problems.

Load balancing is but one problem encountered by users of resources over a communications network. Suppose resources 112–114 are high-speed modems of equal capabilities, and suppose users 108 and 110 have been simultaneously directed to transmit large data files using a modem to a remote computer accessible only over telephone lines. If users 108 and 110 both request resource 112, then only one of them will receive this resource, at best, leaving the other resource request unfulfilled. Finding another, similarly capable and available resource, such as resources 113 and 114, selecting which user receives the other, available resource and directing that user to the other resource are nearly impossible problems to solve at the application program level. Not only do both users 108 and 110 need to be aware of the existence of the high-speed modems 113 and 114, but both users need also to be aware of each other, and to constantly monitor the timing of each other's requests for modem 112.

SUMMARY OF THE INVENTION

The present invention provides a method and system for exchanging data between a user and a distributed resource allocator handling system that allocates computer resources connected to a communications network to users requesting those resources. The distributed resource allocator handling system comprises a number of resource allocator system agents, each running as a separate process on a computer connected to the network. Each resource allocator system agent maintains a database of global network resource information and constantly communicates with all other resource allocator system agents that compose the distributed resource allocator handling system to ensure that each resource allocator system agent has the same global network information. A resource allocator system agent may be accessed directly by a user running on the same computer via an applications programming interface, or may be accessed by a user running on a remote computer via a communications protocol that provides the same functional interface as that provided by the applications programming interface. Resource allocator system agents communicate one with another using a different communications protocol. The elements of the resource allocator handling system provide an efficient load balancing mechanism that allocates resources to users on the basis of similar domain and greatest remaining capacity. Allocation on the basis of closest domain balances communication resources and allocation on the basis of greatest remaining capacity evenly distributes utilization of similar resources.

The present invention also provides a method of load balancing a plurality of resources in a distributed resource allocation system operating across a plurality of domains within a computer network. The method entails receiving a request for a resource having a particular type from an application program in one domain. Resources in the domain are then examined to determine if one or more resources have the requested type. A list of resources having the requested type is received. The list of resources having the requested type is then examined to locate a resource having the greatest available capacity.

BRIEF DESCRIPTION OF THE DRAWINGS

A preferred embodiment of the present invention will be described below relative to the following figures.

FIG. 11 displays a high-level functional description of the resource allocator application programming interface as well as the resource allocation access protocol.

DETAILED DESCRIPTION OF THE INVENTION

The present invention provides a method and system both for exchanging function calls and data between a user and a distributed resource allocator handling system that allocates computer resources to users, as well as for exchanging data between components of the distributed resource allocator handling system. The distributed Resource Allocator Handling System ("RAHS") coordinates resource allocation among multiple users, balancing the workload assigned to similarly capable resources, resolving contentions between users, and acquiring and maintaining information about the capabilities of the distributed resources. Because the RAHS comprises a number of identical separate processes running on two or more computers, the RAHS can survive individual process and machine failures, thus providing fault-tolerant resource allocation.

Figure 1:
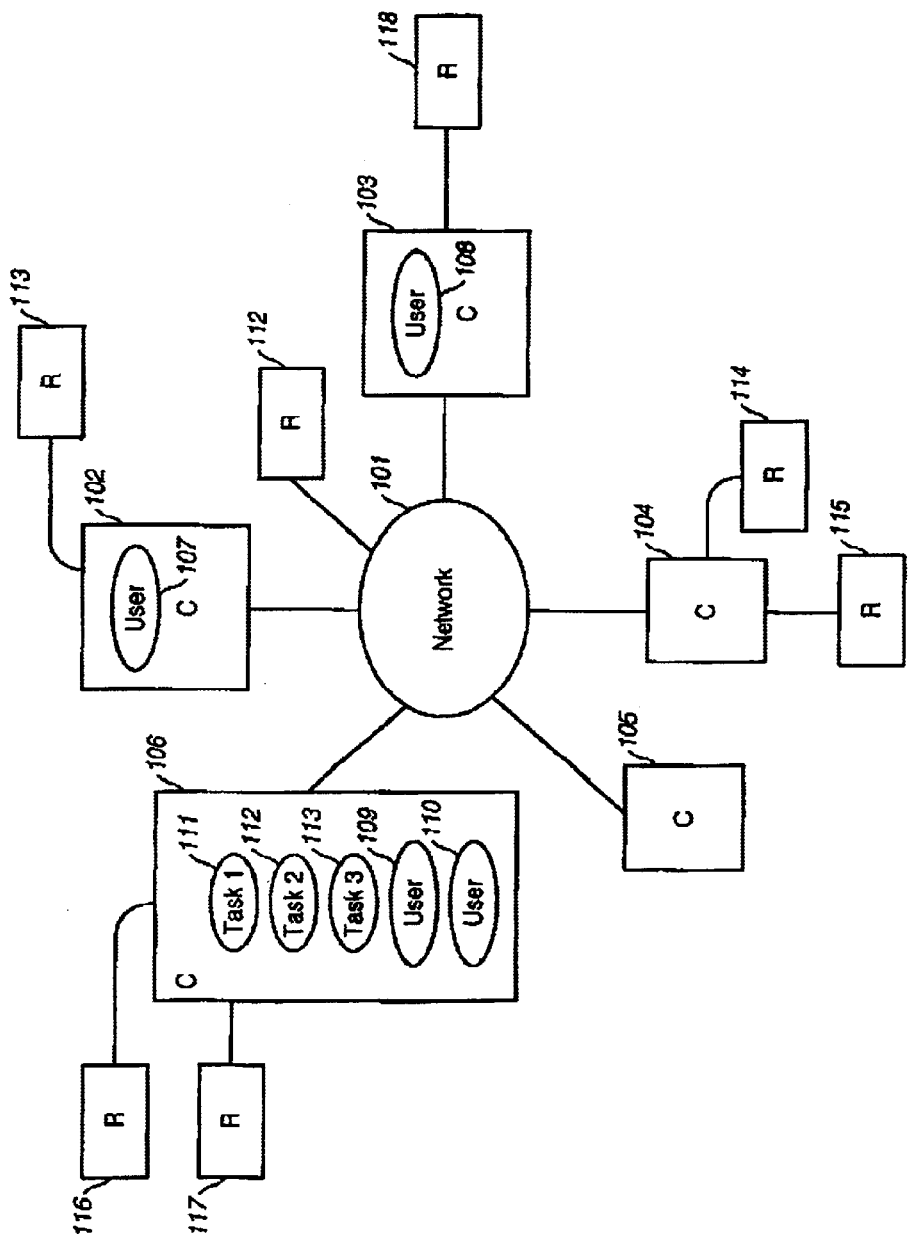
FIG. 1 displays a schematic diagram of a simple communications network.
Figure 2:
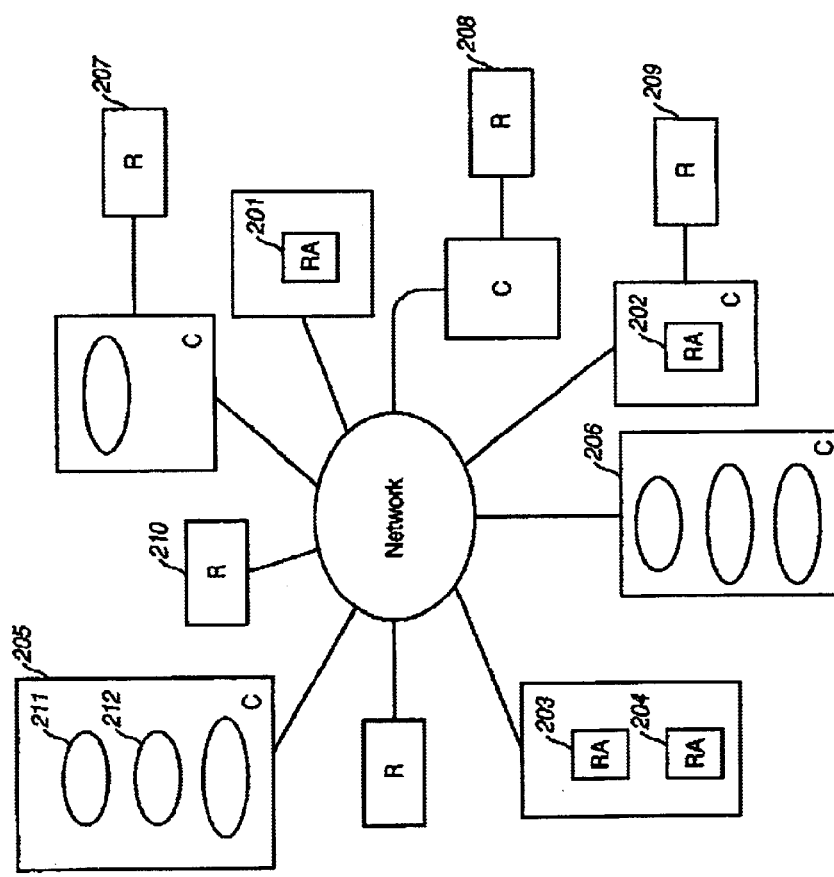
FIG. 2 displays the same communications network as displayed in FIG. 1 with the addition of the resource allocator handling system.

FIG. 2 displays a communications network, similar to the one displayed in FIG. 1, that contains a RAHS. The RAHS comprises a number of resource allocator system agents ("RASAs") that run as separate processes on computers of the communications network. Four resource allocator system agents 201–204 are running on three of the computers of the network in FIG. 2. It is desirable to have two RASAs running on the same computer, exactly mirroring each other's operations, as in the case of RASAs 203 and 204. Failover is relatively easily and rapidly achieved in the case that one of the two co-located RASAs fails or encounters an error condition. However, co-located RASAs are not required for fault-tolerant operation. Any one of the RASAs may substitute for any other RASA running on the communications network.

There are three basic types of information exchange that occur in the context of a RAHS. Users must call functions provided by a resource allocator application programming interface ("RA-API") that are executed by a RASA in order to acquire, relinquish, and use computer resources. In the case that a user runs on a different computer than the RASA to which the function call is directed, the function call is packaged into a resource allocator access protocol ("RAAP") message for transport to the RASA that will execute the fimction call. Data returned to the user in response to the execution of the function call by the RASA is packaged into a return RAAP message and transported back to the user. Finally, each RASA maintains a global network information database ("GNID") that describes the state of the RAHS as a whole. When a RASA executes a function of the RA-API that causes the state of the RAHS to change, for example, a function that allocates a resource to a particular user, that RASA must inform the remaining RASAs of the RAHS that the resource has been allocated to the user, so that each of the remaining RASAs can appropriately update its GNID. The RASAs communicate among themselves using a resource allocator system protocol ("RASP"). The present invention thus comprises the RA-API, the RAAP, and the RASP.

The resources managed by the distributed resource allocator fall into two different categories. A resource may be either task-oriented or interaction-oriented. A task-oriented resource is a resource for which requests are queued and serviced by the resource one at a time. A printer is an example of a task-oriented resource. Each request to print a file is queued upon arrival at the printer. The printer retrieves requests one at a time from the queue and executes each request in its entirety before moving on to the next queued request. Once a user makes a request of the printer, no further interaction between the user and the printer is required. The user may simply wait until the task has been finished and acknowledged by the printer, or may, in some cases, proceed with other computing tasks while waiting for the acknowledgment.

Interaction-oriented resources, on the other hand, require continued communication between the user and the resource while the user's request is being serviced. An example of such an interaction-oriented resource is a modem. Typically, a user establishes a connection with a remote user through an initial request to the modem for a connection, and then engages in a dialog comprising a number of separate requests for transmitting data interleaved with reception of data from the remote user, followed finally by a request to terminate the connection.

Resources may be either simple or complex. Simple resources are single independent resources. Simple resources include ports, terminals, and modems. A complex resource is a collection of subordinate resources that are dependent on a common superior resource. A multitasking computer that is capable of running a number of separate processes is an example of a complex resource. Each process that runs on a multitasking computer is a subordinate resource, and the computer itself is the superior resource on which these subordinate resources depend. In FIG. 2, resources 207, 208, and 209 represent printers. These three resources are simple, task-oriented resources. Resource 210 represents a high-speed modem. Resource 210 is a simple interaction-oriented resource. The multitasking computers 205 and 206 in FIG. 2 represents complex task-oriented superior resources, and the tasks 211 and 212 running on computer 205 represent complex subordinate resources.

Figure 3:
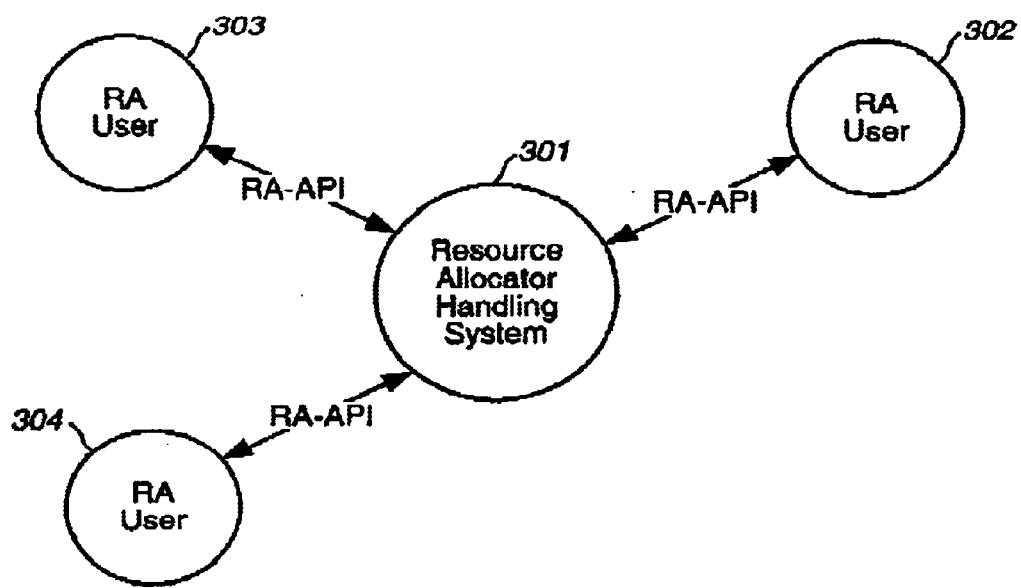
FIG. 3 displays the functional interface between users and the resource allocator handling system.
Figure 4:
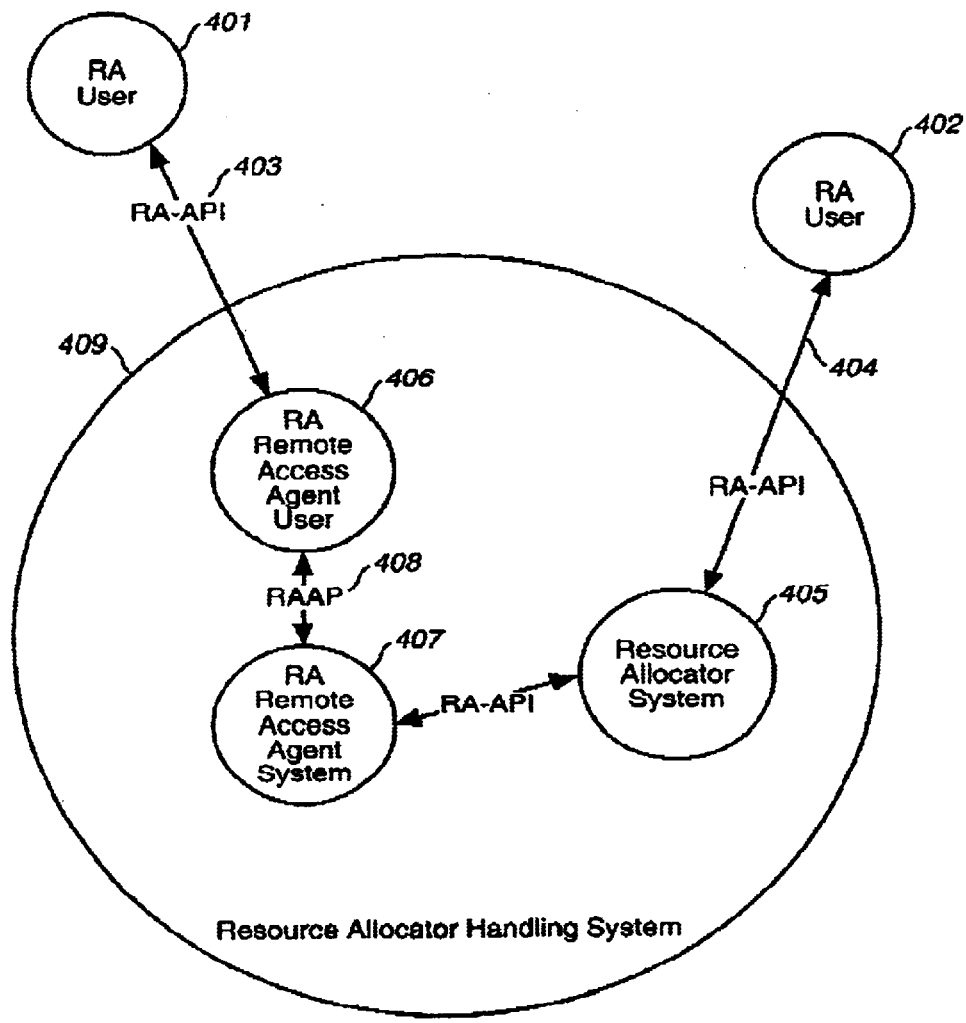
FIG. 4 displays a more detailed view of the resource allocator handling system functional interfaces.
Figure 5:
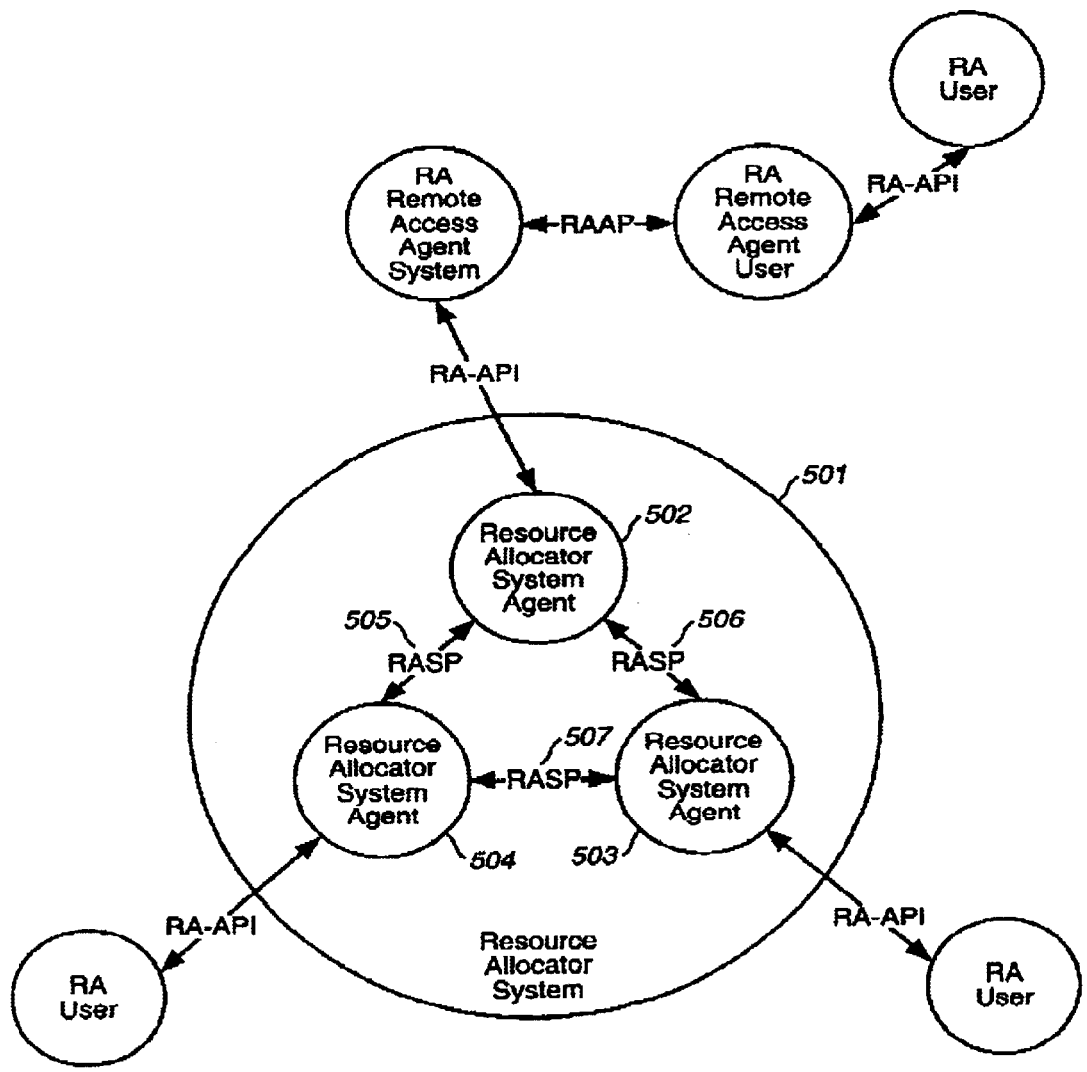
FIG. 5 shows an expanded view of the resource allocator system.

FIGS. 3–5 illustrate, in increasing detail, a functional model of the interfaces and protocols of the RAHS. FIG. 3 displays the functional interface between users of the RAHS and the RAHS as a whole. The RAHS 301 includes all separately executing RASAs running on computers connected to the communications network. Users 302–304 represent separate application programs that make requests for services of resources managed by the RAHS. The interface between the users and the RAHS, shown in FIG. 3 as bidirectional arrows between the users and the RAHS, is the RA-API, a collection of functions called by a user and executed on the user's behalf by the RAHS or called by the RAHS and executed by a user/resource.

FIG. 4 shows a somewhat more detailed view of the functional interfaces within the RAHS. The RAHS 409 in FIG. 4 has been expanded to show several additional components not shown in FIG. 3, including the resource allocator system 405 that comprises a number of RASAs. As in FIG. 3, users 401 and 402 interface to the RAHS by means of the RA-API, shown in FIG. 4 as bidirectional arrows 403 and 404.

In the expanded view of FIG. 4, it can be seen that a user may interact either directly or indirectly with the resource allocator system 405. An example of a direct interaction between a user and the RAHS is the interaction between user 402 and the resource allocator system 405 through the RA-API interface 404. An example of an indirect interaction between a user and the RAHS is the interaction between user 401 and the resource allocator system 405. The indirect interaction requires two additional RAHS components: a remote access agent user ("RAAU") 406 and a remote access agent system ("RAAS") 407. These two components serve to package RA-API calls and returned data into RAAP messages and to transport the RAAP messages over the computer network. This indirect interaction is employed when the user is running on a different computer system than the computer running the RASA to which it is interfacing. To indirectly access a remote RASA, the user interacts directly with a RAAU running on the same system as the user using the RA-API. That RAAU then communicates with a RAAS running on the same system as the RASA using the RAAP 408. The RAAS then communicates directly to the RASA running on the same computer as the RASA using the RA-API. Thus, when a user requests services from a RASA running on a remote computer, it makes those requests using the very same RA-API as it would use to make requests of a RASA running on the local computer system, and the RAAU and RAAS handle the details of transporting the RA-API over the computer network.

FIG. 5 shows an expanded view of the resource allocator system 501. The resource allocator system of FIG. 5 comprises a number of RASAs 502–504. RASAs may run on any number of computers connected to the network, and multiple RASAs may run on the same computer. The RASAs communicate with each other using the RASP 505–507. The RASP provides an additional interface within the resource allocator system that allows each RASA to synchronize its database and its allocation and management activities with those of the other RASAs within the RAHS.

The RASP is symmetrical and supports services for the distributed aspects of the RAHS that allows resource sharing across resource management domains and synchronizes the RASA' knowledge of maintained resources. The services provided by the RAHS through the RASP include establishing bindings to other RASAs and releasing established bindings. The full complement of RASP services provided may be enhanced by an underlying database. Otherwise, the resource allocator system defines the actual services of the RASP.

The RASP usage protocol specifies the acceptable order in which services may be invoked by a RASA. The RASP bind service authenticates the RAAU and RAAS and, if successful, establishes a binding between the RA user and the RAHS. The success of the binding activity depends upon successful completion of the authentication process and the establishment of connectivity between the RAAU and the RAAS. The arguments provided to the RASP bind service include the RASA invoker credentials, service priority, RASP version, and RASA invoker binding context. The RASA invoker credentials authenticate the identity of the RASA invoker. The RASA invoker credentials include the name of the RASA to which the RASA invoker is binding and the password of the RASA. The RASA performer authenticates the RASA invoker by comparing the RASA invoker's password to the password in the RASA invoker's directory entry. If the comparison is positive, authentication is successful. The RASP version argument contains the RAHS services version that the RASA invoker supports. The RASA invoker binding context argument include the context identifier which the RASA invoker uses to correlate subsequent activity associated with this binding.

The arguments provided to the RASP unbind service are the RASA invoker binding context, the RASA performer binding context, and a service priority. The RASA performer binding context argument includes the context identifier which the RASA performer uses to correlate subsequent activity associated with this binding. The RASA performer generates the RASA performer binding context upon successful completion of the RASP bind service. The RASA invoker is required to use this value in all subsequent operations with the RASA performer.

Figure 6:
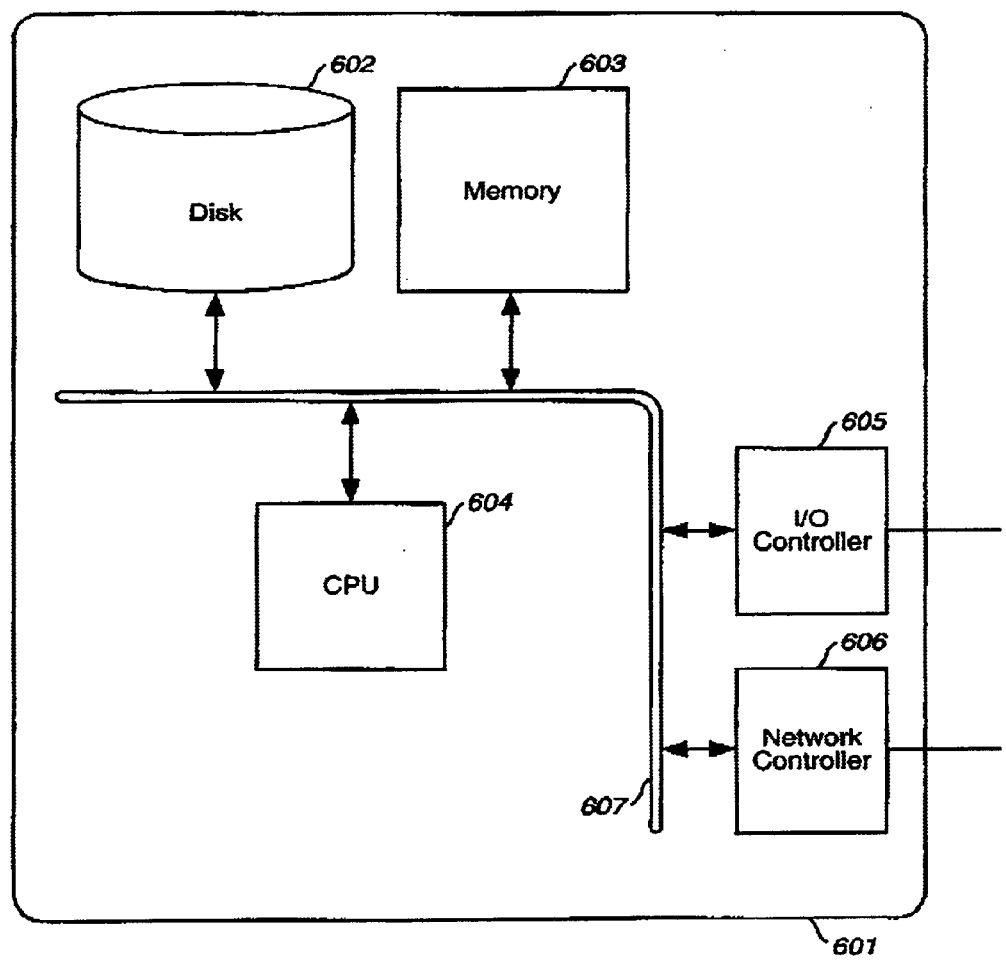
FIG. 6 is a simple diagram of a generalized computer on which the user and resource allocator system agents are executed.

FIG. 6 is a simple diagram of a generalized computer on which the various processes described above are executed. The computer 601 comprises a non-volatile data storage device, commonly a disk drive, 602, high-speed random access memory 603, a central processing unit 604, one or more input/output controllers 605, and a network controller 606. These various components exchange data over at least one internal bus 607. Software programs reside in files on the disk drive. A software program is started by moving all or a portion of the program stored on disk into memory. The central processing unit (CPU) retrieves instructions one after another from memory and executes them. Data transmission from such a computer to a physical data transmission network is accomplished under CPU control by moving data from the computer's memory over the internal bus to the network controller from where it is formatted, packaged, and transmitted to the physical data transmission network. Input/Output controllers and network controllers each generally contain simple memory storage devices and microprocessors.

Figure 7:
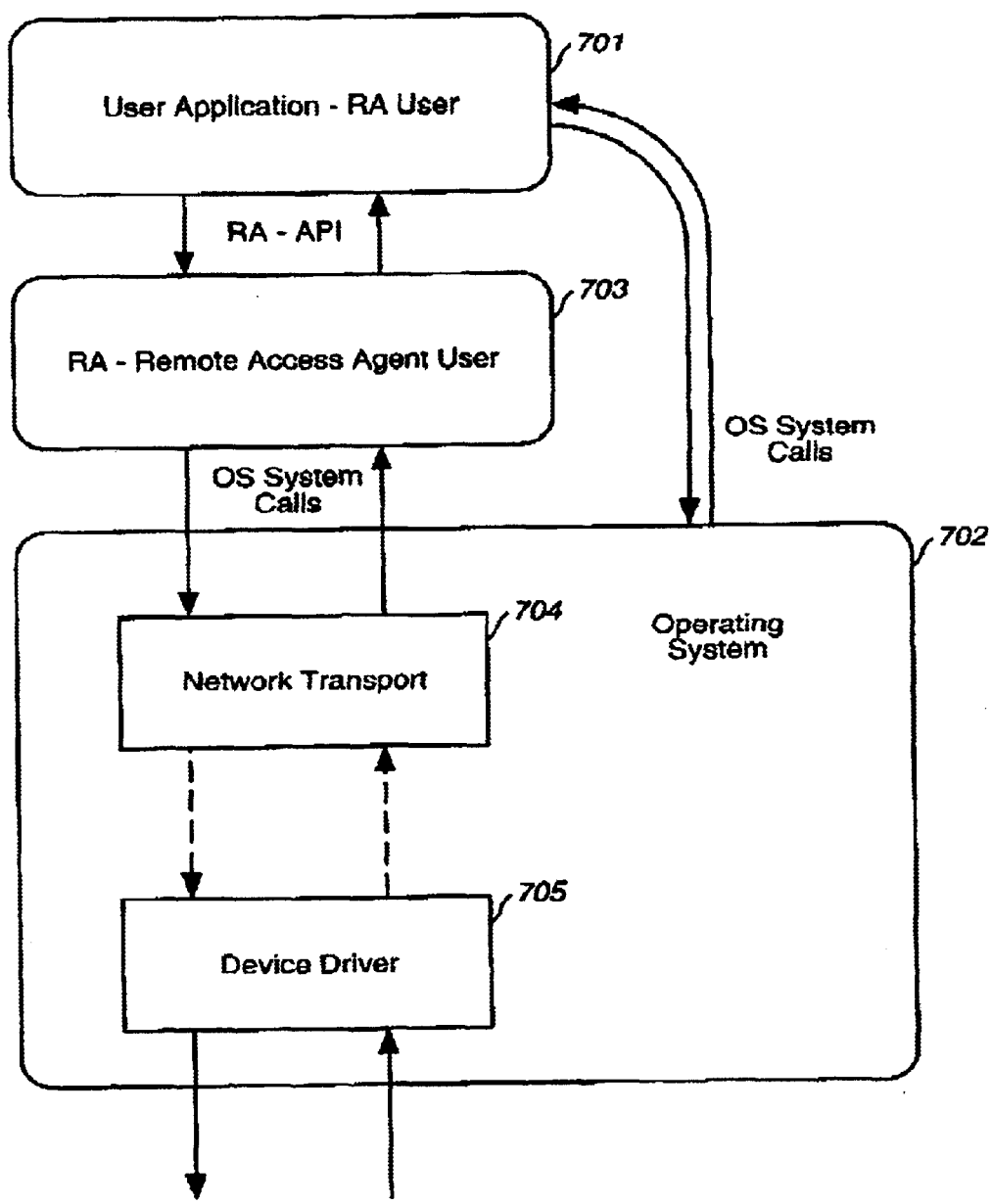
FIG. 7 displays a simple schematic diagram of some of the processes involved in implementing a communications network.

FIG. 7 displays a very simple schematic diagram of some of the processes that run on a computer system in order to allow the computer system to exchange data using a communications network. At the highest level is an application program 701. Such programs are generally written in high-level languages and provide the interface between a computer and a human user. The operating system 702 is a collection of programs that provide services to application programs through the operating system call interface. The operating system call interface provides to an application program functions that the application program can invoke to read and write data to and from the hard disk, transmit data over physical data transmission networks to remote computers, print files on a printer, and other such tasks. In addition, the operating system provides and maintains a program execution environment on a computer that allows for application programs and other intermediate processes to execute in a coordinated fashion. The RAAU 406 in FIG. 4 may run as a separate process in a computer, as shown in FIG. 7. The application program 701 communicates with the RAAU 703 using the RA-API. The RAAU in turn makes operating system system calls in order to package and send RA-API requests to a RAAS on a remote computer using the RAAP. The RAAU packages a RA-API call, along with its arguments, into a data message and passes that data message to the operating system. A subroutine or subprocess within the operating system responsible for network transport 704 further processes and packages the data message in accordance with a lower level network transport protocol. The message is then queued in memory to a very low-level operating system process called a device driver that is responsible for interacting with the network controller to actually send the packaged message over the physical data transmission network. The RAAU may also be implemented as a set of library functions that are linked to the application program, and therefore, together with the application program, constitute a single executable process on a computer.

Figure 8:
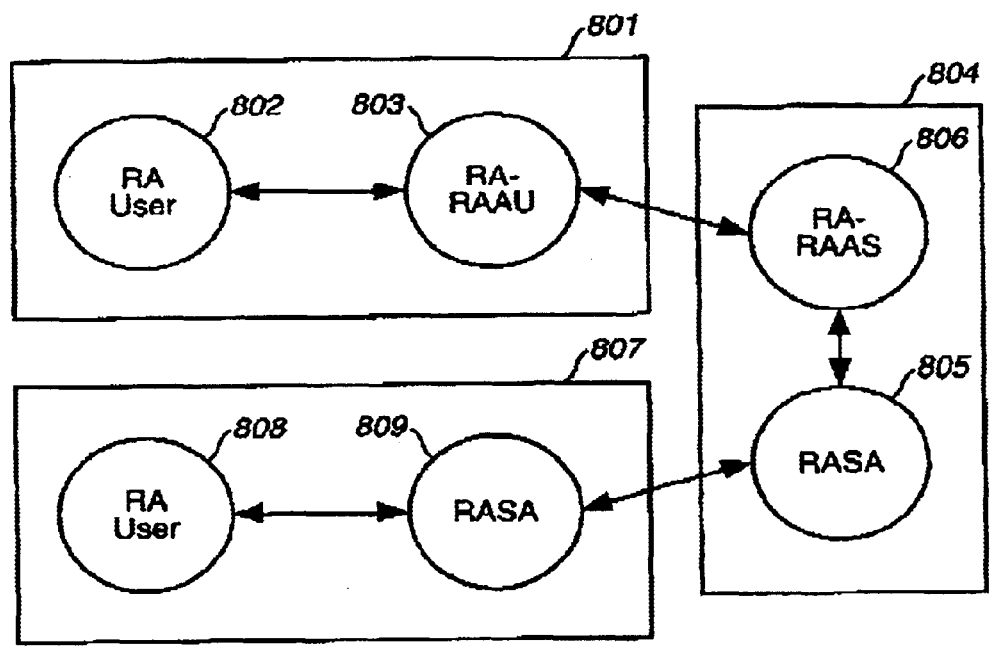
FIG. 8 displays the three basic types of resource allocator handling system component configurations.

FIG. 8 displays the three basic types of RAHS hardware component configurations. Computer 801 includes a user 802 and a RAAU 803. Computer 801 does not include a RASA. Therefore, the user 802 must request allocation of distributed resources from a RASA located on a remote computer. Computer 804 includes a RASA 805 and a RAAS 806. No users run on computer 804. Therefore, the RASA 805 on computer 804 must receive allocation requests from users on remote computers and respond to those requests via the RAAS 806. Finally, computer 807 includes both a user 808 as well as a RASA 809. The user 808 may therefore make allocation requests and receive responses to those requests directly to and from the local RASA 809 using the RA-API. The local RASA 809 also communicates with remote RASAs, such as with RASA 805 using the RASP, in order that all RASAs exactly mirror each other's global network database and monitor each other's allocation activities.

Figure 9:
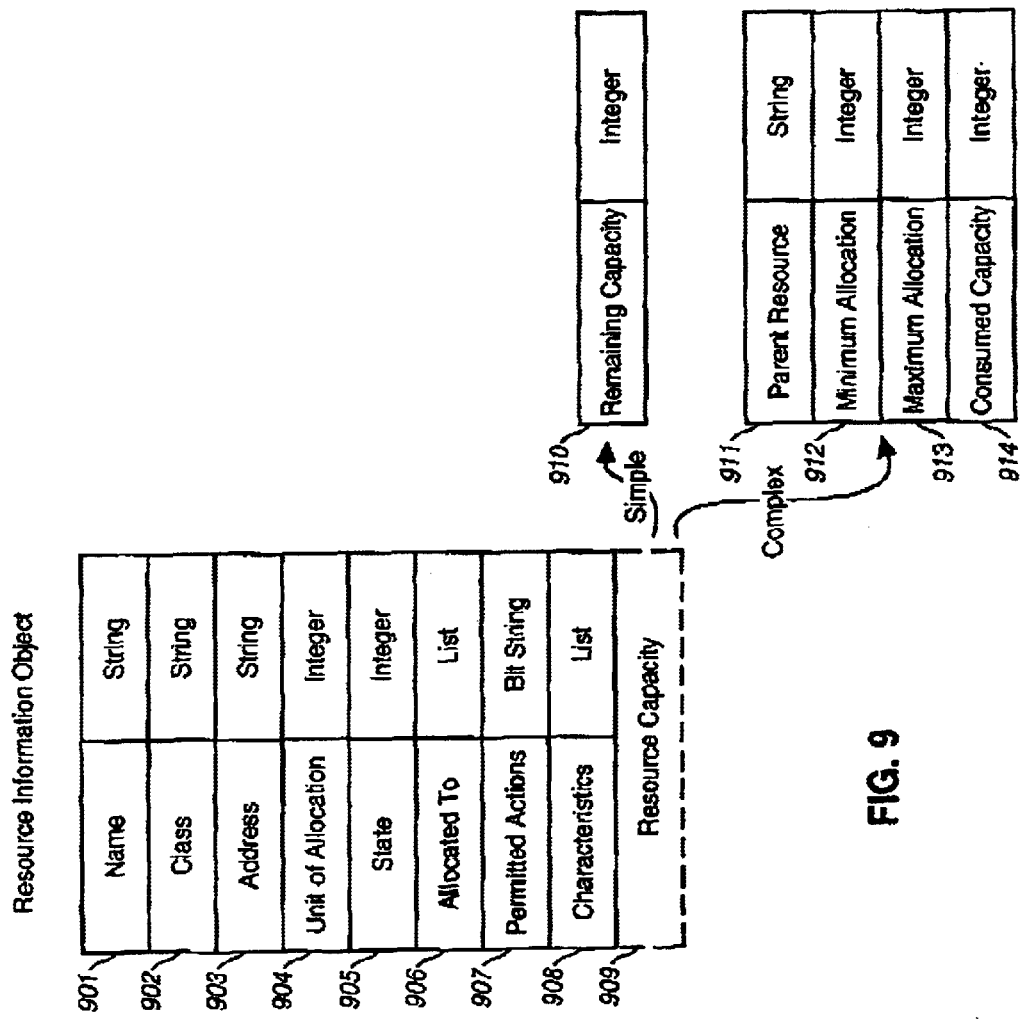
FIG. 9 displays a resource information object.

FIG. 9 displays a resource information object ("RIO"). RASAs maintain in their GNIDs one RIO for every resource managed by the RAHS. The RIO is a collection of data fields, each having a corresponding data type. The field "name" 901 is a character string that uniquely and unambiguously identifies the resource described by a RIO. The field "class" 902 is a character string that identifies the class of resources to which the resource belongs. A resource may belong to only one class. The field "address" 903 is a character string that includes the network address of the resource. This address is provided to users when the resource is allocated to them so that the user may directly bind with an interactive resource.

The field "unit-of-allocation" 904 is an integer that specifies the amount of resource capacity that is consumed by each allocation of the resource. For instance, if the resource is a bank of ten modems, then the unit of allocation for that resource would be one, since the smallest unit of allocation would be a single modem. The capacity of that resource would be ten, since a total of ten units of allocation may be allocated. The field "state" 905 is an integer that describes the current state of the resource. A resource may have one and only one state. Resource states will be discussed further below. The field "allocated-to" 906 include a list of user names and identifies those users to which the resource has been allocated. This field includes a list because a given resource may be allocated to more than one user. In the example cited above, for example, several different users may be allocated one or more modems from the bank of ten modems. The field "permitted-actions" 907 is a bit string that specifies the kinds of operations that may be performed by the resource. There is one bit within the bit string that corresponds to allocation operations, indicating, when set to one, that the resource described by the RIO may be allocated. Another bit within the bit string corresponds to task operations, indicating, when set to one, that tasks may be submitted to the resource described by the RIO. The contents of the permitted actions field along with the contents of the state field together represent the possible state transitions that a resource may undergo, starting from its current state, as a result of a single event or RA-API call.

The field "characteristics" 908 is a list of character strings that further specify characteristics particular to the resource described by the RIO, and may be used, for example, by a user to precisely narrow resource selections to only those resources of interest. The field "resource-capacity" 909 has two different forms, depending on whether the resource described by the RIO is a simple resource or a complex resource. In the case of a simple resource, the resource-capacity field includes a single data element called "remaining-capacity" 910, an integer describing the number of allocation units yet to be allocated. For example, in the case of a bank of ten modems, three of which have been allocated previously to other users, remaining capacity would have the value of 7, indicating that seven modems are available for allocation. In the case of a complex resource, the resource-capacity field comprises the four data elements 911–914. The field "parent resource" 911 is a character string name of the parent resource for the complex resource. In the case of a multitasking computer having subordinate resources corresponding to processes that can be executed on the computer, the parent resource would be the name that uniquely identifies the multitasking computer. The fields "minimum-allocation" 912 and "maximum-allocation" 913 are integers that represent the minimum and maximum limits on the usage of the parent resource. The field "consumed-capacity" 914 is an integer that represents the percentage of allocatable subordinate resources that have already been allocated.

In one embodiment of the invention, initial data fields for a resource's RIO may arrive at a GNID from the resource itself. For example, the resource may include a data structure in microcode that can be transmitted into the GNID. In yet another alternative embodiment, the GNID comprises data dispersed throughout the managed resources. In this embodiment, the GNID database may include data stored within the resource itself and data stored with the RAHS.

Figure 10:
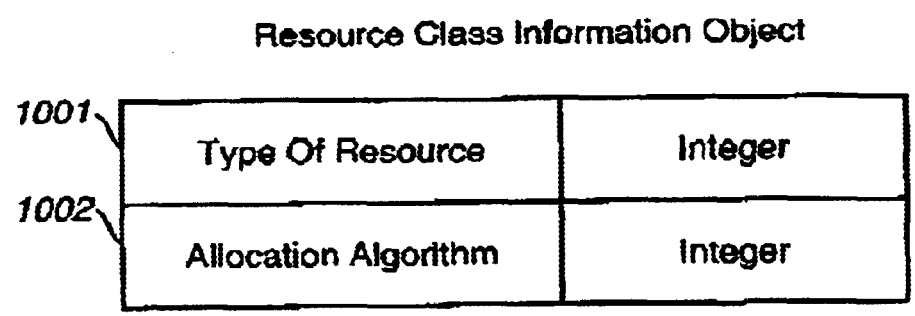
FIG. 10 displays a resource class information object.

Along with RIOs, each RASA maintains information about the various resource classes available on the communications network. FIG. 10 displays a resource class information object that comprises two data fields and that is stored in the GNID maintained by each RASA. The field "type-of-resource" 1001 is an integer that represents the type of the resource represented by this resource class. This field may indicate whether the resource is a complex superior resource, a complex subordinate resource, or a simple resource. The field "allocation-algorithm" 1002 is an integer that specifies one of many possible allocation algorithms by which the resource is to be allocated when requested by users.

The table displayed in FIG. 11 is a high-level description of the interface provided by the RA-API and RAAP. This is essentially a list of the functions provided to users by the RAHS. In the case of one function, "Perform-Task," the RAHS invokes the function and a user performs the function. For all other functions, the RAHS performs the function at the request of the user.

The functions "Bind" and "Unbind" are used to begin a session and end a session, respectively, between a user and the RAHS. The functions "Register-Resource" and "Unregister-Resource" cause a RAHS to add and delete resource information objects from the global network information database. The functions "Begin-Allocating-Resource" and "Stop-Allocating-Resource" cause the RAHS to make a resource available for allocation to users and to terminate allocation of a resource by users, respectively. The function "Allocate-Resource" represents a request by a user to allocate a resource for subsequent use. The function "Set-Current-Capacity" allows a resource acting as an RA user to set the remaining capacity field of the RIO corresponding to that resource stored in the GNID. The function "Deallocate-Resource" represents a request by a user to release a resource that the user has previously allocated. The function "Schedule-Task" essentially represents a request by a user to queue a task to a task-oriented resource. The function "Perform-Task" is called by the RAHS to cause a user, in this case the user being a resource, to perform a scheduled task. Finally, the function "Provide-Next-Task" allows a user, in this case a resource, to request from the RAHS the next task of a series of tasks to be performed.

Figure 12:
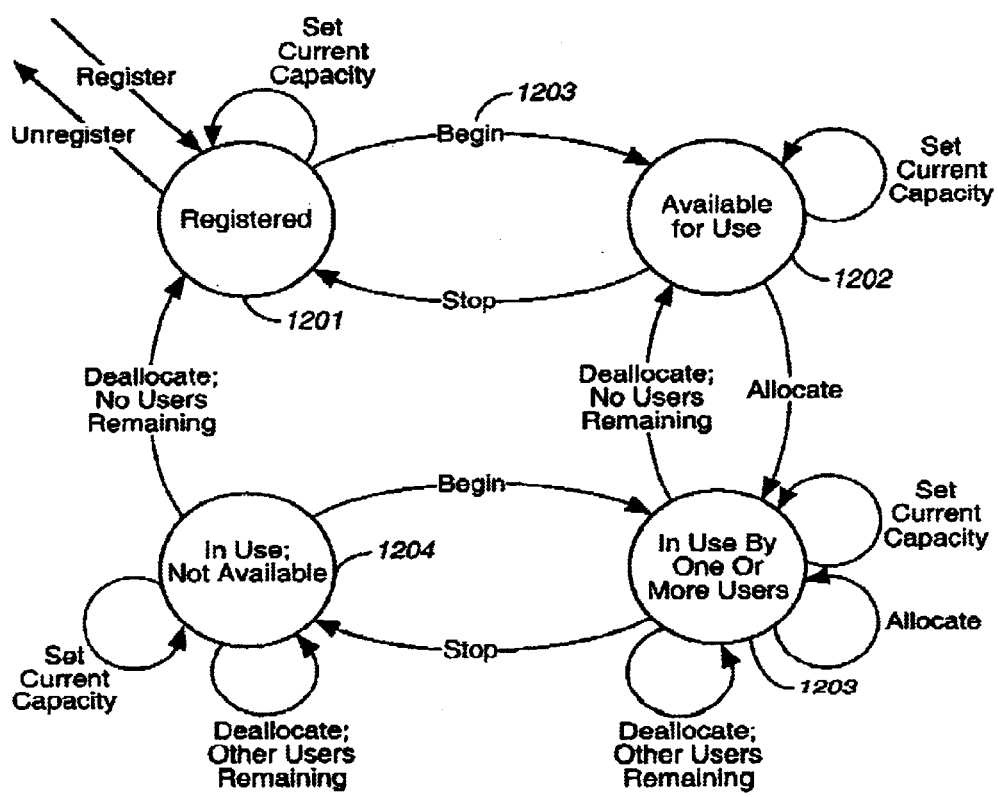
FIG. 12 represents the state transition diagram for a simple resource or a complex subordinate resource.

FIG. 12 represents the state transition diagram for a simple resource or for a complex subordinate resource. Such a resource may have any of the following four states: "Registered" 1201, "Available for Use" 1202, "In Use by One or More Users" 1203, and "In Use—Not Available" 1204. The arrows connecting these four states represent transitions elicited by the performance of RA-API functions listed in FIG. 11 by the RAHS. For example, a call to the function "Begin-Allocating-Resource" will cause a resource in the state "Registered" 1201 to Begin 1203 transition to the state "Available for Use" 1202.

Figure 13:
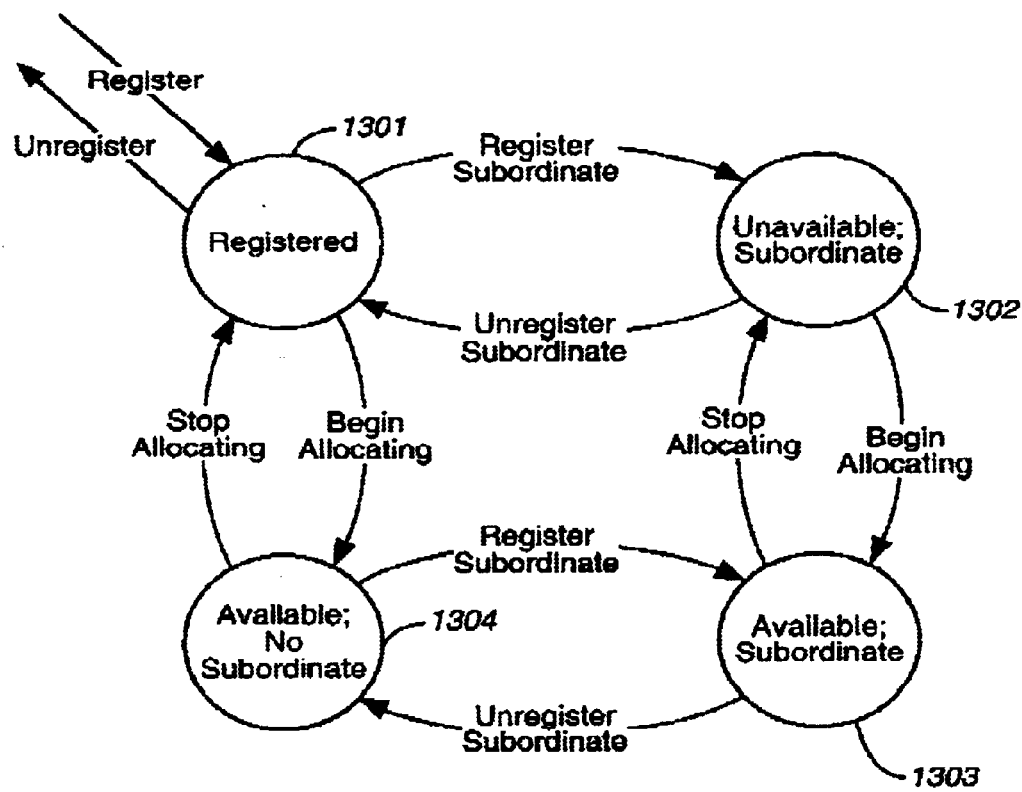
FIG. 13 displays a state transition diagram for a complex superior resource.

FIG. 13 displays a state transition diagram for a complex superior resource. A complex superior resource also has four states: "registered" 1301, "unavailable subordinate" 1302, "available subordinate" 1303, and "available—no subordinate" 1304. As in FIG. 12, state transitions occur when the RAHS executes functions invoked by a user through the RA-API. For example, a complex superior resource that has been registered and is currently in the state "registered" 1301 transitions to the state "unavailable subordinate" 1302 when a user calls the function "Register-Resource" to register a complex subordinate resource that depends on the complex superior resource represented by the state transition diagram.

Figure 14:
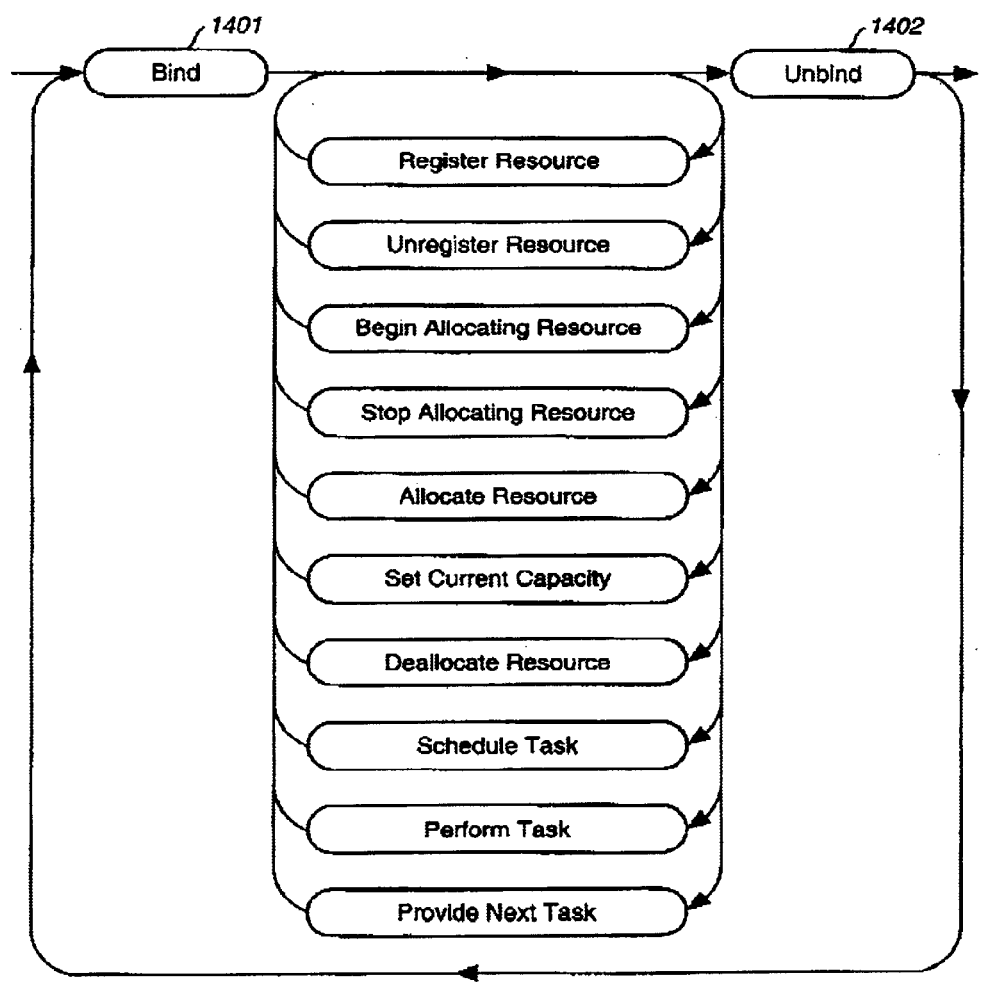
FIG. 14 displays a protocol flow control diagram that describes the resource allocator application programming interface and resource allocation access protocol.

FIG. 14 displays a protocol flow control diagram which shows the orderings of function calls invoked by a user as it establishes a session and makes requests to the RAHS. FIG. 14 indicates that the first function that must be called by a user is the function "Bind" 1401. Subsequently, the user may call any of the remaining ten functions apart from the "Unbind" function. Although these functions may be called in any order, certain of them will return error conditions if they are called prior to calling another of the functions. For example, one cannot call the function "Allocate-Resource" and specify a resource that has not previously been registered through a call by some user to "Register-Resource." When the user has finished allocating and making use of distributed resources, the user calls the function "Unbind" 1402 to terminate the session with the RAHS.

The RA-API functions listed in FIG. 11 will be more fully described below, including the arguments specified when the functions are called. The function "Bind" authenticates a user to the RAHS and, if successfully executed by the RAHS, establishes a session between the user and the RAHS. This established session is the context in which all other RA-API functions are performed. The success of the function "Bind" is dependent upon successful completion of an authentication process. Arguments supplied to Bind include: (1) user credentials; (2) service priority; (3) version; and (4) the user session context. The user credentials argument includes the credentials of the user. These credentials are based on user identification and password protection sufficient for protecting access to a private network. In a public network, more secure authentication credentials are used. The service priority argument specifies the urgency or nonurgency with which the user wants the invoked service to be performed by the RAHS. Possible service priority values are low, medium, and high. The RAFS performs services in order of priority and time of arrival, with the highest priority request performed first. The version argument specifies the version of the services which the user is allowed to use for the session. The user session context is an optional argument that, when present, specifies a context identifier with which the user correlates subsequent activity associated with this session.

Execution of the function "Bind" by the RAHS causes the RAHS to return a result including the user session context, an RAHS session context, the service priority, RAHS credentials, and a version number. The RAHS session context is a context identifier which the RAHS uses to correlate subsequent activity with the associated session. This returned RAHS session context is paired with the user session context to form a session context, essentially a handle, that identifies the session initiated by the call to Bind. The service priority returned by the RAHS is the service priority elected by the RAHS for the session established by this call to Bind. The version returned by the RAHS is the version of the services which the RAHS supports. Finally, the credentials returned by the RAHS include the credentials of the RAHS. These credentials are used by the user to authenticate the identity of the RAHS.

The function "Unbind" causes the RAHS to terminate a session previously established by a call to Bind. Arguments supplied to Unbind include a session context and a service priority. The session context is the handle established or returned by a previously executed call to Bind.

The function "Register-Resource" establishes within the RAHS knowledge of a new resource and causes the RAHS to store a resource information object representing the resource into all the separate databases maintained by RASAs within the communications network. Arguments supplied to the function "Register-Resource" include: (1) session context; (2) service priority; (3) resource name; (4)

resource class; (5) resource address; (6) unit of allocation; (7) resource capacity; (8) permitted actions; and (9) characteristics. The session context is the session context established during a prior call to the "Bind" function. Service priority is the priority requested by the user for execution of this function. The remaining arguments specify the fields of the resource information object as shown in FIG. 9 and discussed above.

The function "Unregister-Resource" removes a resource identifier object from all the databases maintained by the resource allocator system agents within the communications network. The resource is thus removed from the allocatable resource pool. Parent resources, i.e., complex superior resources, cannot be unregistered until all of the subordinate resources that depend on the parent resource are unregistered. Arguments supplied to Unregister-Resource include: (1) a session context; (2) a service priority; and (3) the name of the resource to be unregistered.

The function "Begin-Allocating-Resource" directs the RAHS to begin allocating a specified resource. Arguments supplied to "Begin-Allocating-Resource" include: (1) a session context; (2) a service priority; and (3) the name of the resource. As discussed above, in the case of a simple resource, successful completion of this function causes a state transition of the resource from the state "registered" to the state "available for use" as shown in FIG. 12.

The function "Stop-Allocating-Resource" terminates allocation of a specified resource. Arguments supplied to "Stop-Allocating-Resource" include: (1) a session context; (2) a service priority; and (3) the name of the resource that the user wishes to no longer be allocated. Execution of this function results in a state transition for the resource, as described in FIG. 12.

The function "Allocate-Resource" represents a request by a user to allocate the specified resource. Arguments supplied to Allocate-Resource include: (1) a session context; (2) a service priority; (3) a resource class; (4) max wait duration; (5) request time; and (6) wait priority. The argument "max wait duration" specifies the maximum time which the user will wait for the resource to be allocated. The argument "request time" establishes a time that the user wants the RAHS to use in providing a first-come-first-serve service. The user may use the current date and time or use the date and time at which some higher level context was initiated. The argument "wait priority" establishes the wait priority for allocation of resources for a requested operation. The function "Allocate-Response" returns the address of the allocated resource if it is successfully allocated. This address corresponds to the resource address field of the resource information object 903 in FIG. 9.

The function "Set-Current-Capacity" establishes the remaining capacity of a complex resource. Arguments supplied to Set-Current-Capacity include: (1) a session context; (2) a service priority; (3) a resource name, and (4) a new capacity.

The function "Deallocate-Resource" releases a previously allocated resource and returns it to the pool of unallocated resources. Execution of this function results in a state transition for the resource as described by FIGS. 12 and 13. Arguments supplied to Deallocate-Resource include: (1) a session context; (2) service priority; and (3) the name of the resource to be deallocated.

The function "Schedule-Task" enables a user to enqueue a task to a specified resource. Arguments supplied with this function include: (1) a session context; (2) a service priority; and (3) a function. The argument "function" specifies how the task is to be queued. A task may be queued to a resource class so that the RAHS can determine a particular member of the class to execute the task, or it may be queued to a specific resource identified by the name or by the network address of the resource.

The function "Perform-Task" is called by the RAHS to instruct an allocated resource to perform a scheduled task. Arguments supplied with this function include: (1) a session context; (2) a service priority; and (3) a task ID which identifies a task to be performed. The function "Performs-Task" returns a result which indicates that: (1) the task has been completed; (2) that the task has been rescheduled to be completed by another resource; or (3) that no resource was able to perform the task.

The function "Provide-Next-Task" provides a user or resource with the ability to request from the RAHS another task to perform. In other words, the RAHS maintains a batch of tasks to be performed by this resource and the resource requests tasks from the RAHS one at a time. The result of this function call indicates either that no further tasks are available to perform or that the next task will be sent as a result of a following "Perform-Task" call by made the RAHS to the user or resource.

Figure 15:
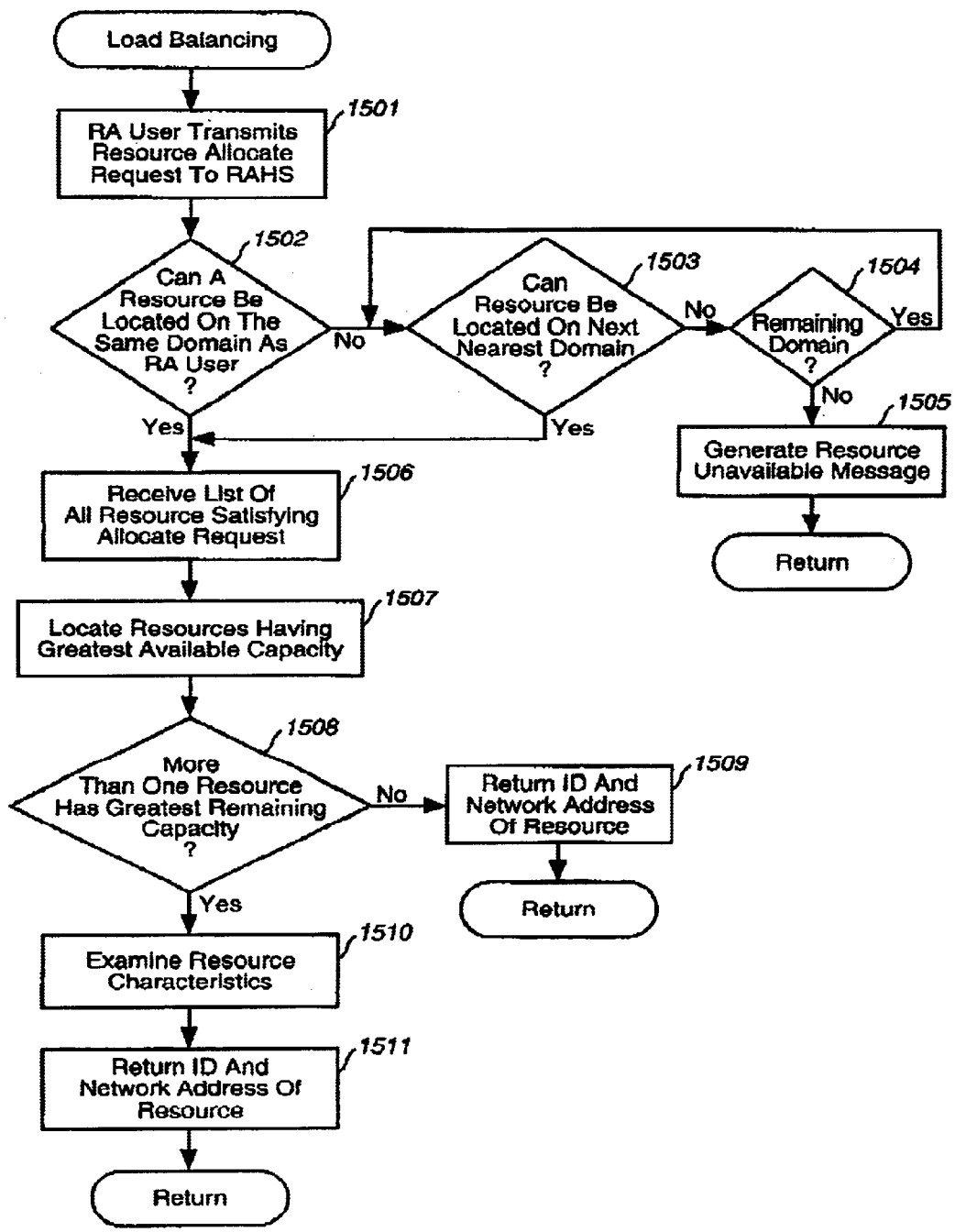
FIG. 15 provides a flowchart illustrating a load balancing procedure performed by the RAHS.

The RAHS balances the workload assigned to similarly capable resources. FIG. 15 provides a flowchart illustrating the load balancing procedure followed by the RAHS.

An RA user transmits a resource Allocate request to the RAHS (step 1501). This request includes the type and capabilities of the resource needed by the RA user. The RAHS attempts to allocate an available and qualified resource and return to the RA user the resource's identification and network address. Depending upon the type of resource requested, the resource may be blocked from allocation to another user until released by a present user. If the resource accommodates multiple RA users, then allocation to a new user decrements the resource's remaining capacity accordingly. If a resource specifically requested by the RA user is not available, then the RAHS may allocate another resource that still satisfies the RA user's request. For example, an RA user may request a modem having a 28.8 kbps capability; however, when the RAHS determines that no modems of this capability are available, the RAHS may accommodate the RA user's Allocate request with a 14.4 kbps modem. Allocation depends in large part on the RA user's specific Allocate request. If an RA user specifies a "28 kbps modem," then only a 28 kbps modem will suffice. If the RA user specifies "28 kbps or less modem," then a 14.4 kbps modem may be selected. If the RA user specifies a "28 kbps or greater modem," then a 56 kbps modem may be selected.

As discussed above, each resource has a resource information object (RIO) data structure, such as the resource information object shown in FIG. 9. The RAHS examines the RA user's Allocate request to identify all available resources on the same domain satisfying the RA user's request (step 1502). The RA user's Allocate request will include a resource class, such as resource class 902 of FIG. 9, which the RAHS examines to locate the resources available on the RA user's domain. As previously discussed, the RIOs generally reside in a GNID database that may be queried by an RAHS component such as a RASA.

If the RAHS cannot locate an available resource on the RA user's domain, then the RAHS examines the next nearest domain to locate an available resource satisfying the Allocate request (step 1503). If the RAHS can still not satisfy the RA user's Allocate request on the nearest available domain, then the RAHS continues examining the next nearest domain until a resource is found or until no more domains remain (step 1504). If no domains remain, then the RAHS generates a resource unavailable message and sends it to the RA user (step 1505), then terminates the load balancing procedure.

If one or more resources may be located on the RA user's domain or on a neighboring domain, then the RAHS receives a list of all resources satisfying the RA user's Allocate request (step 1506). The RAHS examines the resource capacity of each resource in the list of received resources to find the resource having the greatest available capacity (step 1507). As previously mentioned, the resource capacity is a field in the resource information object, such as resource capacity 909 as shown in FIG. 9. This resource capacity field applies to both simple and complex resources.

If the RAHS determines that more than one resource tie for having the greatest remaining capacity (step 1508), then the RAHS examines additional characteristics of those resources (step 1510). For example, two modem blocks may each have five remaining available modems, rendering these two modem blocks in a tie for having the greatest remaining capacity. However, one modem block may be 56 kbps while the other modem block is 28.8 kbps. Assuming the RA user has requested a capacity of 28.8 kbps or greater, then the RAHS selects the 28.8 kbps modem set because this modem set has the greatest remaining capacity and most closely satisfies the RA user's request.

Once the RAHS has identified the resource satisfying the RA user's request, the RAHS returns the identification and network address of the resource to the RA user (steps 1509 and 1511). The RAHS then decrements the resource capability field of the resource information object for the selected resource.

In an alternate embodiment, the RA user may specify both class and subclass information in forming an Allocate request. The subclass information pertains to characteristics that may become important in selecting a particular resource to fulfill the Allocate request. The RA user's Allocate request may specify a particular resource. In this case, if the requested resource is not available, then the RA user's request will be appropriately queued.

Suppose the RA user 808, as shown in FIG. 8, sends an Allocate request specifying a modem having a "28.8 kbps or greater" capacity to the RASA 809. The RASA 809 receives the RA user's Allocate request through the RA-API. The RASA 809 examines the RIOs in its GNID to determine if at least one RIO satisfies the RA user's Allocate request. Assume that the RASA 809 has in its GNIDs three RIOs each having a class field, such as class field 902 as shown in FIG. 9, matching the class of resources in the RA user's Allocate request. The RASA 809 then examines the resource capacity field 909 of these three RIOs, all representing modems. The RASA 809 determines that one of these modems is at its full capacity, e.g., no remaining capacity. The RASA determines that the two other modems, whose RIOs both fulfill the RA user's Allocate request, each have identical remaining capacity fields 910. The RASA 809 then examines the characteristics field 908 of each of these two remaining resources. The RASA 809 determines that one modem has a 28.8 kbps characteristic and the other modem has a 56 kbps characteristic. Since the RA user's Allocate request specified "28.8 kbps or greater," the modem having the 28.8 kbps best satisfies the allocation request. The RASA 809 then selects the RIO of the 28.8 kbps modem for the RA user 808. The RASA adds the RA user's identification to the allocated-to field 906 of the RIO for the 28.8 kbps modem. The RASA 809 then sends the name 901 and address 903 of the 28.8 kbps modem to the RA user 808. Finally, the RASA 809 decrements the remaining capacity 910 field of the RIO for the 28.8 kbps modem.

Another alternate embodiment, similar to the first described embodiment, employs a first fit method. Table 1 provides pseudocode illustrating an exemplary embodiment of the load balance procedure using the first fit method. As shown in Table 1, a load balancing function in the RAHS receives input from the RA user and the Allocate request. The load balancing function locates all resources on the domain of the RA user that satisfy the Allocate request. If no resource on the RA user's domain satisfies the Allocate request, then the load balancing function examines the next available domain so long as domains are available or until a resource is located that satisfies the Allocate request.

TABLE 1

```
Load_Balance (RA User, Allocate Request)
{
    Locate all resources on the RA user's domain that satisfy the Allocate
Request:
    If no resource on the RA user's domain satisfies Allocate Request:
        then
            {
            until (no more domains remain) or (resource(s) located)
                {
                Locate all resources on next available domain that satisfy
                                    the Allocate Request:
                }
            }
    If no resource(s) satisfies the Allocate Request
        then
            {
            Generate Resource Unavailable Message:
            }
        else
            {
            For all resource(s) satisfying Allocate Request
                {
                Sort resources by greatest remaining capacity:
                Select resource on top of the list:
                }
            Return selected resource's identification and network address:
            Adjust resource capacity for selected resource in database:
            }
}
```

If no resources satisfy the RA user's Allocate request, then the load balancing function generates a resource unavailable message. If one or more available resources satisfy the RA user's request, then the load balancing function determines which resource of the identified resources best satisfies the RA user's request in a load balancing context while satisfying the RAHS's load balancing goals.

For all the resources satisfying the RA user's Allocate request, the load balancing function sorts the resources according to the greatest remaining capacity. The load balancing function performs this step by examining the capacity field in the resource's RIO. The load balancing function then performs a first fit selection by selecting the resource at the top of the sorted list in this embodiment. This embodiment avoids examination of additional characteristics. The load balancing function then returns the selected resource's identification and network address. Finally, the load balancing function adjusts the remaining resource capacity field of the resource's RIO in the GNID database.

While the present invention has been described with reference to a preferred embodiment thereof, those skilled in the art will appreciate that various changes in form and detail may be made without departing from the intended scope of the present invention as defined in the appended claims. For example, the RASAs may differ from those shown in the figures. Moreover, the RAHS may be run on different types of computing systems or on computing systems differing substantially from the computing network provided herein. The RAHS and its components may be applied in connection with systems and methods for flow control and data transmission.

In one exemplary embodiment, the RAHS is designed to be compliant with the Telecommunications Management Network (TMN), a set of standards used by network management systems. The TMN provides a network management model defined in International Telecommunications Union Telecommunications (ITU-T) recommendation M.30 and related recommendations. The TMN is intended to form a standard basis for management of advanced networks such as Synchronous Digital Hierarchy (SDH) for fiber-optics in LAN lines and Global System for Mobile communications (GSM) in the cellular communications arts. The TMN specifies a set of standard functions with standard interfaces and makes use of a management network which is separate and distinct from the information transmission network. The TMN also specifies standard network protocols such as the Open Systems Integration Common Management Information Protocol (OSI CMIP). The TMN provides a network management standard which seeks to provide information technology, business and network service management in multi-domain environments.

Further aspects of the invention are described in the following copending patent applications, each of which is assigned to a common assignee: U.S. application Ser. No. 09/365,635, "Method and System for Contention Controlled Data Exchange in Distributed Network-Based Resource Allocation" filed on Aug. 3, 1999, and U.S. application Ser. No. 09/365,635, "Method and System for Maintenance of Global Network Information in a Distributed Network-Based Resource Allocation System," filed Aug. 3, 1999, now U.S. Pat. No. 6,523,065. All of the above U.S. patents and applications are incorporated by reference.

Although specific embodiments of, and examples for, the invention are described herein for illustrative purposes, various equivalent modifications are possible within the scope of the invention, as will be recognized by those skilled in the relevant art. The teachings provided herein of the invention may be applied to other distributed resource allocation systems, not necessarily the exemplary distributed resource allocation system described above. Various exemplary computing systems, and accordingly, various other system configurations may be employed under the invention.

The embodiments of the invention disclosed herein have been discussed with regard to computerized network installations, such as those using large centralized computing systems. However, the invention finds equal applicability in other computing systems, such as small, portable computerized systems and even hand-held computing devices.

These and other changes can be made to the invention in light of the above detailed description. In general, in the following claims, the terms used should not be construed to limit the invention to the specific embodiments disclosed in the specification and the claims, but should be construed to include all distributed resource allocation systems that operate under the claims. Accordingly, the invention is not limited by the disclosure, but instead its scope is to be determined entirely by the following claims.

What is claimed is:

1. In a computer network, a distributed resource allocation system operating across a plurality of domains within the computer network that balances the assignment of resources, comprising:

a resource allocator in a domain that receives a resource request from an application program;

a resource database including data regarding resources in the domain of the resource allocator;

a load balancing mechanism that examines the resource database to locate a resource in the domain of the resource allocator matching the resource request, and if more than one resource matches the resource request, forms a resource list by sorting the more than one resource according to greatest remaining capacity and selects a resource in the resource list based on a predetermined rule;

another resource allocator in another domain that communicates with the load balancing mechanism; and another resource database containing data regarding resources in the another domain, wherein if the load balancing mechanism does not locate a resource in the resource database that matches the resource request, then the load balancing mechanism examines the another resource database to locate a resource matching the resource request, and if more than one resource matches the resource request, forms a resource list by sorting the more than one resource according to greatest remaining capacity and selects a first resource in the resource list.

2. The system recited in claim 1 wherein the resource database includes data regarding resources in the plurality of domains and wherein if the load balancing mechanism does not locate a resource in the domain of the resource allocator that matches the resource request, then the load balancing mechanism examines the resource database to locate a resource in another domain that matches the resource request, and if more than one resource in another domains matches the resource request, forms a resource list by sorting the more than one resource in another domain according to greatest remaining capacity and selects a resource in the resource list.

3. The system recited in claim 1 wherein the predetermined rule selects the resource in the resource list that leads the list.

4. The system recited in claim 1 wherein the predetermined rule selects the resource in the resource list having the best fit.

5. The system recited in claim 1, further comprising an application programming interface to the application program that interfaces with the resource allocator, wherein the application program interface includes an Allocate-Resource function that causes the resource allocator to allocate the resource to the application program.

6. The system recited in claim 1, further comprising an application programming interface that provides functions that are called by the application program and executed by the resource allocator, including functions that allocate, deallocate, and make use of the resources.

7. The system recited in claim 1, wherein each resource is categorized and described in the resource database as being a member of one of two categories that include task-oriented and interaction-oriented resources, a task-oriented resource accepting and executing tasks assigned to it without needing additional interaction with an application program assigning the task, and an interaction-oriented resource requiring a dialogue or interaction with an application program in order to complete a task.

8. The system recited in claim 1, wherein each resource is described in the resource database as having a total capacity for handling a maximum number of tasks or dialogues and a remaining capacity that identifies that portion of the total capacity that has not been allocated to application programs through calls to an application programming interface.

9. The system recited in claim 1, further comprising a flow control and data transmission interface both between the application program and the resource allocator that coordinates use of the network resources by the application program and between components of the resource allocator, wherein the components of the resource allocator include resource allocator systems that execute functions called by the application program.

10. The system recited in claim 1, further comprising a resource allocator user agent associated with the resource allocator that transfers function calls from application programs running on one computer over the computer network, and a resource allocator system that transfers function calls received over the computer network from the resource allocator user agent to the resource allocator for execution.

11. The system recited in claim 1, further comprising an application programming interface to the application program that interfaces with the resource allocator and includes a Set-Current-Capacity function that causes the resource allocator to set a remaining capacity description stored in the resource database for a resource indicated by arguments to the Set-Current-Capacity function to a particular value indicated by an argument to the Set-Current-Capacity function.

12. The system recited in claim 1, further comprising an application programming interface to the application program that interfaces with the resource allocator and includes a Schedule-Task function that causes the resource allocator to schedule a task, indicated by an argument to the Schedule-Task function, to a resource indicated by an argument to the Schedule-Task function.

13. The system recited in claim 1, further comprising an application programming interface to the application program that interfaces with the resource allocator, wherein the application program interface includes a Bind function that causes the resource allocator to establish a session with the application program, a handle indicating the established session returned to the application program by the resource allocator as a result of successfully executing the Bind function, wherein the established sessions provides to the application program a context in which to make subsequent function calls to the distributed resource allocator handling system.

14. In a computer network, a distributed resource allocation system operating across a plurality of domains within the computer network that balances the assignment of resources, comprising:
  a resource allocator in a domain that receives a resource request from an application program;
  a resource database including data regarding resources in the domain of the resource allocator;
  a load balancing mechanism that examines the resource database to locate a resource in the domain of the resource allocator matching the resource request, and if more than one resource matches the resource request, forms a resource list by sorting the more than one resource according to greatest remaining capacity and selects a resource in the resource list based on a predetermined rule;
  another resource allocator in another domain that communicates with the load balancing mechanism using a remote access system protocol for transferring data from one resource allocator to another resource allocator; and
  another resource database containing data regarding resources in the another domain,
  wherein if the load balancing mechanism does not locate a resource in the resource database that matches the resource request, then the load balancing mechanism examines the another resource database using the remote access system protocol to locate a resource matching the resource request.

15. In a computer network that interconnects computer resources, a flow control and data transmission interact both between application programs and a distributed resource allocator handling system that coordinates use of the computer resources by the application programs and between components of the distributed resource allocator handling system, wherein the components of the distributed resource allocator handling system include resource allocator systems that execute functions called by the application programs, resource allocator user agents that transfer function calls from application programs running on one computer over the computer network to a second computer, and resource allocator system agents that transfer function calls received over the computer network from a resource allocator user agent to a resource allocator system for execution, the flow control and data transmission interface comprising:
  an application programming interface that provides the functions that are called by the application programs and executed by a resource allocator system, including functions that allocate, deallocate, and make use of the computer resources;
  a remote access agent protocol used by a resource allocator user agent running on a local computer to encapsulate the application programming interface function calls made by an application program running on the local computer and transport the encapsulated function calls over the computer network to a resource allocator system agent running on a remote computer, and used by the resource allocator system agent to encapsulate data returned by a resource allocator system running on the remote computer in response to the function calls and transport the encapsulated data over the computer network to the resource allocator user agent; and
  a remote access system protocol used by the resource allocator systems of the distributed resource allocator handling system to transfer data from one resource allocator system to another.

16. The flow control and data transmission interface of claim 15 wherein the application programming interface includes a Bind function that causes the resource allocator handling system to establish a session with a calling application program, a handle indicating the established session returned to the calling application program by the resource allocator handling system as a result of successfully executing the Bind function, wherein the established session provides to the application program a context in which to make subsequent function calls to the resource allocator handling system.

17. The flow control and data transmission interface of claim 15 wherein the application programming interface includes a Register-Resource function that causes the resource allocator handling system to add a description of a resource indicated by arguments to the Register-Resource function into a global network information database.

18. In a computer network that interconnects computer resources, a method for exchanging function calls and data between application programs and a distributed resource allocator handling system that coordinates use of the computer resources by the application programs and for exchanging data between components of the distributed resource allocator handling system, wherein the components of the distributed resource allocator handling system include a resource allocator system that execute functions called by the application programs, a resource allocator user agent that transfer function calls from application programs running on one computer over the computer network to a second computer, and a resource allocator system agent that transfer function calls received over the computer network from the resource allocator user agent to the resource allocator system for execution, the method comprising:

calling a function within an application program that is provided by an application programming interface and executed by the resource allocator system;

when the resource allocator system is running on a different computer than on which the application programs is running, passing the function call from the application program to the resource allocator user agent running on the same computer as that on which the application programs is running, packaging the function call by the resource allocator user agent into a remote access agent protocol message and sending the remote access agent protocol message over the computer network to the resource allocator system agent running on the same computer as than on which the resource allocator system is running, and unpackaging the function call from the received remote access agent protocol by the resource allocator system agent and passing the function call directly from the resource allocator system agent to the resource allocator system;

when the resource allocator system is running on the same computer as that on which the application programs is running, passing the function call directly from the application program to the resource allocator system;

executing the function by the resource allocator system and returning to the application program data provided by the resource allocator system as a result of execution of the function call; and when execution of the function by the resource allocator system causes the resource allocator system to change data stored in a global network information database to describe a current state for the distributed resource allocator handling system and when more than one resource allocator system is running on the computer network, sending a resource allocator system protocol message from the resource allocator system that executed the function call to all remaining resource allocator systems running on the computer network so that all resource allocator systems can accordingly update their respective global network information databases.

19. The method of claim 18 wherein the application programming interface includes an Allocate-Resource function that causes the resource allocator handling system to allocate a resource indicated by arguments to the Allocate-Resource function to a calling application program for subsequent use by the calling application program.

20. The method of claim 18 wherein each resource is described in the global network information database as having a total capacity for handling a maximum number of tasks or dialogues and a remaining capacity that identifies that portion of the total capacity that has not been allocated to application programs through calls to the application programming interface function Allocate-Resource.

* * * * *